United States Patent Office 3,450,790
Patented June 17, 1969

3,450,790
POLYSULFIDE POLYMER BLENDS
Billy D. Simpson, Akron, Ohio, assignor to Phillips Petroleum Company, a corporation of Delaware
No Drawing. Filed Jan. 19, 1967, Ser. No. 610,234
Int. Cl. C08g 33/00; C09d 5/34
U.S. Cl. 260—823                                10 Claims

ABSTRACT OF THE DISCLOSURE

A polysulfide polymer prepared by the reaction of sulfur with at least one dithiol selected from the group consisting of 3-(2-mercaptoethyl)cyclohexanethiol, 4-(2-mercaptoethyl)cyclohexanethiol, and mixtures thereof, is blended with a polysulfide polymer prepared by the reaction of sulfur with a dithiol having two primary mercapto groups, a minor amount of a polythiol having at least three mercapto groups being used in the preparation of at least one of the polysulfide polymers; the resulting blend can be cured at ambient temperature with conventional curing agents.

---

This invention relates to polysulfide polymer blends which are easily curable at ambient temperature.

Polysulfide polymers have been found to be useful in a number of applications. For example, it is known that some liquid polysulfide polymers can be cured to solid compositions with chemical agents such as lead dioxide, organic salts of heavy metals and atmospheric oxygen, organic peroxides, ozone, and the like. Therefore, such polymers are of utility in applications requiring sealants, caulking materials, and the like. In such applications it is usually important that curing be achieved at ambient temperature. However, some polymers do not cure readily at temperatures such as room temperature.

For instance, one of the more desirable polysulfide polymers for use in caulking compounds from the standpoint of the physical properties of the cured polymer and the availability of the raw materials is a polymer produced by the reaction of sulfur with (1) at least one dithiol selected from the group consisting of 3-(2-mercaptoethyl)cyclohexanethiol and 4-(2-mercaptoethyl)-cyclohexanethiol, and mixtures thereof, and (2) a minor amount of a polythiol having at least three mercapto groups. However, this material is not readily curable with standard curatives in a reasonable period of time at ambient temperatures.

On the other hand polysulfide polymers prepared by the reaction of sulfur with (1) a dithol having two primary mercapto groups and (2) a minor amount of a polythiol having at least three marcapto groups cure rapidly at ambient temperature. However, when cured using the usually preferred curing agents such as lead dioxide these polymers exhibit poor physical properties unless special procedures are used, apparently due to the uncontrolled manner in which the curing takes place. Yet the physical properties of the cured polymer is of great importance. With the advent of curtain-wall construction, materials are required to seal the joints between large metal to metal sections, metal to glass sections, and the like. In this type of construction wind pressures and temperature variations create strains which can be accommodated only by elastomeric materials having high elongations and moderate hardness. Age hardening, for instance, has to be minimized to provide materials which will stand up for long periods of time. With large movement of the joints adhesion also becomes important.

It is an object of this invention to provide a polysulfide polymer blend suitable for caulking which is fluid and easily applied in its uncured state.

It is further object of this invention to provide a polysulfide polymer blend suitable for caulking which is readily curable at ambient temperature using conventional curing agents such as lead dioxide.

It is a still further object of this invention to provide a polymer composition suitable for caulking which possesses in its cured state physical properties suitable for a caulking compound such as a high degree of resiliency.

In accordance with my invention, a polysulfide polymer prepared by the reaction of sulfur with at least one dithiol selected from the group consisting of 3-(2-mercaptoethyl)cyclohexanethiol, 4 - (2-mercaptoethyl)cyclohexanethiol, and mixtures thereof is blended with a polysulfide polymer prepared by the reaction of sulfur with a dithiol having two primary mercapto groups, a minor amount of a polythiol having at least three mercapto groups being used in the preparation of at least one of the polysulfide polymers. This blend has the desired physical properties for caulking compounds when cured at ambient temperature with conventional curing agents without the use of additional additives or special procedures to control the temperature during curing.

The use of a polythiol having at least three mercapto groups in the preparation of at least one of the polysulfide polymers is required to provide the necessary sites for the crosslinking which occurs during the curing process.

The dithiol utilized in the process of this invention to prepare the first component of the blend is selected from the group consisting of 3-(2-mercaptoethyl)cyclohexanethiol, 4-(2-mercaptoethyl)cyclohexanethiol, and mixtures thereof. The presently preferred material is a mixture of 3-(2-mercaptoethyl)cyclohexanethiol and 4-(2-mercaptoethyl)cyclohexanethiol as prepared in accordance with the process of Example I of Rector P. Louthan, U.S. 3,050,452, issued Aug. 21, 1962. While the mixture of these dithiols for the first component can be a distilled fraction, it is also within the contemplation of the invention to utilize the dithiol admixture with other materials, such as the crude product of Example I of U.S. 3,050,452. However, it is desirable to minimize the presence of reactive monofunctional compounds as these materials tend to prematurely terminate the polymer growth.

The dithiol utilized to prepare the second component of the blend has two primary mercapto groups attached to a divalent organic radical preferably having 2–20 carbon atoms. The divalent organic radical can contain carbon and hydrogen only, or it can contain oxygen in the form of an ether linkage or sulfur in the form of a sulfide linkage. The presence of an ether or sulfide linkage within an aliphatic chain separating the mercapto groups imparts to the final cured product greater flexibility at low temperatures. For example, 1,2-ethanedithiol,
1,10-decanedithiol,
1,20-eicosanedithiol,
2-methyl-1,4-butanedithiol,
2-methyl-1,5-pentanedithiol,
2-phenyl-1,4-butanedithiol,
p-xylylenedithiol,
3-cyclopentyl-1,6-hexanedithiol,
bis(2-mercaptoethyl) ether,
bis(3-mercaptopropyl) ether, and
bis(3-mercaptopropy) sulfide and the like are applicable. The polythiol utilized in the process of the invention can be represented by the formula:

$$R(SH)_n$$

where R is a hydrocarbon radical selected from the group consisting of saturated aliphatic, saturated cycloaliphatic, aromatic radicals and combinations thereof such as aryl-substituted aliphatic radicals, alkyl-substituted aromatic radicals, and the like, said hydrocarbon radical having from 3 to about 20 carbon atoms and having a valence equal to $n$, $n$ being an integer of at least three. While $n$ will generally be in the range of 3 to 6, it is presently preferred that $n$ be 3 or 4 because of the greater availability of the compounds. Examples of polythiols suitable for use in accordance with the invention include 1,2,3-propanetrithiol,
1,2,4-butanetrithiol,
1,2,3,4-butanetetrathiol,
1,2,3-pentanetrithiol,
3-methyl-1,2,3-heptanetrithiol,
1,2,10-decanetrithiol,
1,2,3,5,6-dodecanepentathiol,
1,2,4,5,7,8-hexadecanehexathiol,
2,3,5,8-eicosanetetrathiol,
1,2,3-cyclopentanetrithiol,
1,2,3,4-cyclohexanetetrathiol,
2-ethyl-1,2,3,4-cyclooctanetetrathiol,
2-(mercaptomethyl)-1,3-cyclopentanedithiol,
2-cyclohexyl-1,3,4-butanetrithiol,
1,2,3-benzenetrithiol,
1,2,4,5-benzenetetrathiol,
toluene-2,3,4-trithiol,
toluene-$\alpha$,2,3,4-tetrathiol,
2-phenyl-1,3,6-hexanetrithiol, and mixtures thereof. While a dithiol is also a polythiol throughout this application the term polythiol is used to indicate thiols having more than two mercapto groups as distinguished from dithiols which have two.

The mole ratio of polythiol containing at least three mercapto groups to dithiols can vary over a broad range, depending in part on the particular polythiol employed, but will generally be in the range of about 0.001:1 to about 0.1:1, and preferably will be in the range of about 0.005:1 to about 0.05:1. The ratio of dithiols to sulfur will generally be in the range of about 0.5 to about 4 moles of dithiols per gram-atom of sulfur and will preferably be in the range of about 0.8 to about 2 moles of dithiols per gram-atom of sulfur.

In the preparation of both the first and second polysulfide polymers of the blend, the polythiol, dithiol and sulfur can be reacted in the presence or absence of a catalyst and in the presence or absence of a solvent. When desired, a basic catalyst can be utilized to accelerate the reaction of the sulfur with the thiols. The presently preferred catalysts are amines, ammonia, and the oxides, hydroxides, and carbonates of lithium, sodium, potassium, rubidium, cesium, magnesium, calcium, strontium, and barium. When desired, a solvent such as chloroform, carbon tetrachloride, benzene, toluene, xylene and the like can be employed. While the order of addition of sulfur, polythiol and dithiol can be varied, it is presently preferred to premix the polythiol and dithiol to provide a more uniform polymer. All of the sulfur can be introduced into the reaction initially or the sulfur can be added incrementally. Although the temperature of the reaction can vary within a considerable range, it will generally be in the range of about −20° C. to about 250° C. and will usually be in the range of about 20° C. to about 200° C. The reaction time also can vary considerably, depending in part on the temperature and whether a catalyst is utilized, but will generally be in the range of about 1 minute to about 2 days and will usually be in the range of about 5 minutes to about 12 hours. The pressure need be only sufficient to maintain the reactants and/or solvent substantially in the liquid phase. In instances where the dithiol is being polymerized in the absence of a polythiol having at least three mercapto groups these same conditions are used.

The molecular weight of the liquid polymeric material produced by the reaction can vary in a wide range but generally will be in the range of 400 to about 10,000, depending upon the ratios of the polythiol (if any), dithiol and sulfur and upon the conditions of the reaction, and more usually will be in the range of about 600 to about 2,250. The Brookfield viscosity of the liquid polymer ranges from about 1,000 to about 500,000 cps., preferably about 2,000 to about 350,000 cps. The liquid reaction product can be processed, as by stripping, to remove undesired low boiling materials.

The resulting first and second polymers are then blended together in any conventional manner, for instance by stirring them together in a blender. Just before the composition is to be used the curing agent is added. This may be done during the blending step or separate from the blending step.

The weight ratio in the blend of the polymer of the first dithiol containing one primary mercapto group to the polymer of the second dithiol containing two primary mercapto groups is preferably within the range of about 1:1 to 10:1, thus giving about 50 to about 91 parts by weight of said first dithiol based on 100 parts of said blend. Larger ratios would result in incomplete cure at ambient temperature, and smaller ratios would result in the apparently uncontrolled type of cure characteristic of the second dithiol polymer alone with its resulting production of a polymer of inferior physical properties.

While lead dioxide is the preferred curing agent other conventional curing agents such as organic salts of heavy metals in conjunction with atmospheric oxygen, organic peroxides and the like can be used. When using lead dioxide said lead dioxide is preferably present in an amount sufficient to provide 0.25 to 1 molecule of lead dioxide for every 1 mercapto group in said polymer.

EXAMPLE I

A mixture of 3-(2-mercaptoethyl)cyclohexanethiol and 4-(2-mercaptoethyl)cyclohexanethiol was prepared by the method of Example I in U.S. 3,050,452. A mixture of 352 g. (2.0 moles) of the above mixture of dithiols, 4.2 g. (0.03 mole) of 1,2,3-propanetrithiol, 54.4 g. (1.70 g.-atoms) of sulfur, and 2 ml. of tributylamine was stirred for 1 hours at room temperature, after which the temperature was gradually increased to 180° C. over a period of 7 hours. The mixture was maintained under reduced pressure throughout the 7-hour heating period, through the use of a water aspirator. The resulting first liquid polysulfide polymer had a number average molecular weight, by osmometry, of 912 and a Brookfield viscosity of 335,000 cps. at 26° C.

To prepare a second polymeric polysulfide, 51.2 g. (1.60 g.-atoms) of sulfur was added in small portions over a period of 50 minutes to a mixture, at 25° C., of 311 g. (1.87 moles) of bis(3-mercaptopropyl) ether, 4.2 g. (0.03 mole) of 1,2,3-propanetrithiol, and 2 ml. of tributylamine. The mixture was then maintained at 25° C. for 2¾ hours, after which the mixture was heated to 160° C., under the reduced pressure of a water aspirator, over a period of 1½ hours. Heating at 160° C. under reduced pressure was continued for an additional 70 minutes. The resulting polymeric polysulfide, a slightly viscous oil, had a number average molecular weight, by osmometry, of 937 and a Brookfield viscosity of approximately 1000 cps. at 260 C.

A mixture of 10 parts by weight of the first polymer, 1 part by weight of the second polymer, and 5 parts by weight of lead dioxide paste (containing 75 parts by weight of technical lead dioxide and 25 parts by weight of dibutyl phthalate) was allowed to stand at room temperature for about 94 hours. Solid product was obtained having a Shore A hardness (ASTM D 1706–61; Shore durometer, type A) determined approximately 33 hours later, of 45–48. The 5 parts by weight of lead dioxide was chosen so as to give a 10 percent excess of lead dioxide.

In a procedure similar to that employed in the preparation of said second polymer in this example, a polymeric polysulfide having a number average molecular weight, by osmometry, of 1876 was prepared from 438 g. (2.41 moles) of bis(3-mercaptopropyl) sulfide, 6 g. (0.05 mole) of 1,2,3-propanetrithiol, 65.3 g. (2.04 g.-atoms) of sulfur, and 2 ml. of tributylamine. Also, in a procedure similar to that employed in the preparation of said second polymer of this example, a polymeric polysulfide was prepared from 226 g. (1.81 moles) of 2-methyl-1,4-butanedithiol, 5.0 g. (0.036 mole) of 1,2,3-propanetrithiol, 52.2 g. (1.63 g.-atoms) of sulfur, and 2 ml. of tributylamine. This polymer had a number average molecular weight, by osmometry, of 1023 and a Brookfield viscosity of 310,000 cps. at 26° C. These polymers are also suitable for blending with said first polymer of this example to give a composition curable at room temperature.

Control I

Ten parts by weight of the first polysulfide polymer of Example I and 4.3 parts by weight of the lead dioxide paste (approximately 10 percent excess) described in Example I were mixed and allowed to stand for 176 hours at room temperature. The polymer remained tacky, apparently little cure having taken place.

Control II

The second polysulfide of Example I made using bis(3-mercaptopropyl) ether was mixed at room temperature with the same proportion of lead dioxide (10 percent excess) as in Example I. A vigorous reaction began immediately with evolution of heat. A soft non-elastic polymer was obtained.

It is apparent that without some special treatment the polymer from the dithiols having one primary mercapto group of Control I is not particularly well suited for a caulking composition because it did not cure at room temperature. It is equally apparent that without some special treatment the polymers of dithiols having two primary mercapto groups as shown by Control II are not suitable for caulking compositions because of poor physical properties which are apparently the result of the cure proceeding at an uncontrolled rate.

However, the blend of a polymer from dithiols having one primary mercapto group with a polymer from a dithiol having two primary mercapto groups as shown in Example I, cured to a solid with hardness characteristics indicating a material suitable for caulking compositions.

While this invention has been described in detail for the purpose of illustration, it is not to be construed as limited thereby, but is intended to cover all change and modifications within the spirit and scope thereof.

I claim:

1. A polymer composition comprising a blend of (1) about 50 to about 91 parts by weight per 100 parts of said blend of a first dithiol polymer prepared by the reaction of sulfur with a dithiol selected from the group consisting of 3 - (2-mercaptoethyl)cyclohexanethiol, 4-(2-mercaptoethyl)cyclohexanethiol, and mixtures thereof and (2) about 9 to about 50 parts by weight per 100 parts of said blend of a second dithiol polymer prepared by the reaction of sulfur with a dithiol having two primary mercapto groups attached to a divalent organic radical having from 2 to 20 carbon atoms, at least one of the polymers of (1) and (2) being further characterized by being formed in the presence of from 0.1 to 10 mol. percent based on the dithiol of a polythiol having the formula $R(SH)_n$ wherein R is a hydrocarbon radical selected from the group consisting of saturated aliphatic, saturated cycloaliphatic, aromatic radicals, and combinations thereof, said hydrocarbon radical having from 3 to 20 carbon atoms and having a valence equal to $n$, $n$ being an integer of at least three.

2. A polymer composition according to claim 1 wherein the dithiol used in the preparation of said second dithiol polymer is selected from the group consisting of bis(3-mercaptopropyl) ether, bis(3-mercaptopropyl) sulfide, and 2-methyl-1,4-butanedithiol.

3. A polymer composition according to claim 1 wherein the ratio of dithiol to sulfur in each reaction is in the range of about 0.5 to about 4 moles of dithiol per gram-atom of sulfur.

4. A polymer composition according to claim 1 wherein the polythiol is 1,2,3-propanetrithiol.

5. A polymer composition according to claim 1 wherein the blend contains in addition a curing agent.

6. A polymer composition according to claim 1 wherein the blend contains in addition sufficient lead dioxide to provide 0.25 to 1 molecule of lead dioxide for every 1 mercapto group in said polymer.

7. A polymer composition according to claim 2 wherein the ratio of dithiol to sulfur in each reaction is in the range of about 0.5 to 4 moles of dithiol per gram-atom of sulfur, and the polythiol is 1,2,3-propanetrithiol.

8. A polymer composition according to claim 7 wherein the blend contains in addition sufficient lead dioxide to provide from 0.25 to 1 molecule of lead dioxide for every 1 mercapto group in said polymer.

9. A process for forming a cured caulking composition comprising: blending (1) about 50 to about 91 parts by weight per 100 parts of said blend of a first dithiol polymer prepared by the reaction of sulfur with a dithiol selected from the group consisting of 3 - (2 - mercaptoethyl)cyclohexanethiol, 4-(2-mercaptoethyl)cyclohexanethiol, and mixtures thereof and (2) about 9 to about 50 parts by weight per 100 parts of said blend of a second dithiol polymer prepared by the reaction of sulfur with a dithiol having two primary mercapto groups attached to a divalent organic radical having from 2 to 20 carbon atoms, at least one of the polymers of (1) and (2) being further characterized by being formed in the presence of from 0.1 to 10 mol percent based on the dithiol of a polythiol having the formula $R(SH)_n$ wherein R is a hydrocarbon radical selected from the group consisting of saturated aliphatic, saturated cycloaliphatic, aromatic radicals, and combinations thereof, said hydrocarbon radical having from 3 to 20 carbon atoms and having a valence equal to $n$, $n$ being an integer of at least three; adding sufficient lead dioxide to said blend to provide from 0.25 to 1 molecule of said lead dioxide for every 1 mercapto group in said polymer; and maintaining said blend containing lead dioxide at substantially ambient temperature until curing has taken place.

10. The product prepared by the process of claim 9.

References Cited

UNITED STATES PATENTS

| | | | |
|---|---|---|---|
| 3,050,452 | 8/1962 | Louthan | 204—162 |
| 3,316,194 | 4/1967 | Payne et al. | 260—823 |
| 3,389,106 | 6/1968 | Simpson | 260—79 |

SAMUEL H. BLECH, *Primary Examiner.*

M. J. TULLY, *Assistant Examiner.*

U.S. Cl. X.R.

260—79